US010855775B2

(12) United States Patent
Kim

(10) Patent No.: US 10,855,775 B2
(45) Date of Patent: Dec. 1, 2020

(54) TECHNIQUES FOR IMPLEMENTING PERSISTENTLY INTERACTIVE SOFTWARE ROBOTS

(71) Applicant: Soroco Private Limited, London (GB)

(72) Inventor: Yoongu Kim, Cambridge, MA (US)

(73) Assignee: Soroco Private Limited, London (GB)

( * ) Notice: Subject to any disclaimer, the term of this patent is extended or adjusted under 35 U.S.C. 154(b) by 375 days.

(21) Appl. No.: 15/480,054

(22) Filed: Apr. 5, 2017

(65) Prior Publication Data

US 2017/0295243 A1 Oct. 12, 2017

Related U.S. Application Data

(60) Provisional application No. 62/318,995, filed on Apr. 6, 2016.

(51) Int. Cl.
*G06F 15/16* (2006.01)
*H04L 29/08* (2006.01)
*G06F 21/44* (2013.01)
*G06F 9/451* (2018.01)
(Continued)

(52) U.S. Cl.
CPC ............ *H04L 67/141* (2013.01); *G06F 9/452* (2018.02); *G06F 21/44* (2013.01); *H04L 41/20* (2013.01); *H04L 41/22* (2013.01); *H04L 67/146* (2013.01); *H04L 67/34* (2013.01); *H04L 67/38* (2013.01); *H04L 67/40* (2013.01); *H04L 63/083* (2013.01); *H04L 63/10* (2013.01); *H04L 67/10* (2013.01)

(58) Field of Classification Search
None
See application file for complete search history.

(56) References Cited

U.S. PATENT DOCUMENTS

2005/0027584 A1* 2/2005 Fusari ............... H04L 29/12009
709/203
2007/0274233 A1* 11/2007 Ptashek .................. H04L 67/16
370/254

(Continued)

OTHER PUBLICATIONS

International Search Report and Written Opinion for International Application No. PCT/US2017/026201 dated Jul. 4, 2017.

(Continued)

*Primary Examiner* — Mohamed Ibrahim
(74) *Attorney, Agent, or Firm* — Wolf, Greenfield & Sacks, P.C.

(57) ABSTRACT

According to at least one aspect, a system configured to execute a software robot such that interactive actions may be performed by the software robot without interruption is provided. The system comprises at least one hardware processor configured to execute an operating system. The system further comprises at least one non-transitory computer-readable storage medium storing processor-executable instructions configured to execute in a service session in the operating system that, when executed by the at least one hardware processor, causes the at least one hardware processor to: start a first remote desktop session in the operating system, establish a loopback remote desktop connection between the first remote desktop session and the service session, and start a software robot computer program in the first remote desktop session.

20 Claims, 7 Drawing Sheets

(51) Int. Cl.
*H04L 29/06* (2006.01)
*H04L 12/24* (2006.01)

(56) References Cited

U.S. PATENT DOCUMENTS

| | | | |
|---|---|---|---|
| 2011/0276661 A1* | 11/2011 | Gujarathi | G06F 9/452 709/219 |
| 2011/0307544 A1* | 12/2011 | Lotlikar | G06F 9/468 709/203 |
| 2012/0192079 A1* | 7/2012 | Burk | G06F 3/0481 715/740 |
| 2013/0060842 A1* | 3/2013 | Grossman | H04L 12/4641 709/203 |
| 2013/0067100 A1 | 3/2013 | Kuzin et al. | |
| 2016/0234198 A1* | 8/2016 | Breiman | H04L 63/0815 |

OTHER PUBLICATIONS

PCT/US2017/026201, Jul. 4, 2017, International Search Report and Written Opinion.
[No Author Listed], Knowledge Base. Interactive Session Management. 4 pages, https://www.uipath.com/kb-articles/interactive-sessions [accessed Dec. 8, 2016].

* cited by examiner

TECHNIQUES FOR IMPLEMENTING PERSISTENTLY INTERACTIVE SOFTWARE ROBOTS

CROSS-REFERENCE TO RELATED APPLICATIONS

This application claims the benefit under 35 U.S.C. § 119(e) of U.S. Provisional Application Ser. No. 62/318,995, entitled "TECHNIQUES FOR IMPLEMENTING PERSISTENTLY INTERACTIVE SOFTWARE ROBOTS" filed on Apr. 6, 2016, which is herein incorporated by reference in its entirety.

FIELD

Aspects of the technology described herein relate to techniques for implementing persistently interactive software robot computer programs. Some aspects relate to techniques for creating a desktop interface in an operating system for a software robot computer program to use without interruption while the desktop interface is protected from unauthorized users.

BACKGROUND

Software robot computer programs (hereinafter, "software robots") are computer programs configured to programmatically control another computer program (e.g., an application, a service, or an operating system). A software robot may control another computer program by manipulating its GUI. For example, a software robot may click buttons and/or fill in text fields in the GUI of another computer program. A software robot may control another computer program to perform one or more actions in furtherance of a task. A task may be, for example, a sequence of one or more actions (e.g., buttons clicks and/or keystrokes) that culminates in an objective being completed such as resetting a password or creating a document.

SUMMARY

According to at least one aspect, a system is provided. The system comprises at least one hardware processor configured to execute an operating system that is configured to execute a plurality of sessions comprising a service session for the system, a console session for a local user, and at least one remote desktop session. The system further comprises at least one non-transitory computer-readable storage medium storing processor-executable instructions organized as a controller computer program configured to execute in the service session in the operating system that, when executed by the at least one hardware processor, causes the at least one hardware processor to perform: starting a first remote desktop session in the operating system, establishing a loopback remote desktop connection between the first remote desktop session and the service session, and starting a software robot computer program in the first remote desktop session. The software robot computer program is configured to control at least one other computer program executing in the first remote desktop session to perform a task.

In some embodiments, the at least one other computer program comprises a graphical user interface (GUI) and the first remote desktop session is configured generate a desktop interface comprising the GUI. In some embodiments, the software robot computer program is further configured to control the at least one other computer program to perform the task by programmatically controlling the at least one other computer program at least in part by emulating actions through the GUI of the at least one other computer program. In some embodiments, the first remote desktop session is configured to provide information indicative of a state of the desktop interface to the service session using the loopback remote desktop connection.

In some embodiments, the operating system is configured to start a second remote desktop session in the operating system and establish a shadow connection between the second remote desktop session and the first remote desktop session responsive to receiving a request from a console session executing in an operating system of another computing device. In some embodiments, the first remote desktop session is configured to provide information indicative of the state of the desktop interface in the first remote desktop session to the second remote desktop session using the shadow connection. In some embodiments, the second remote desktop session is configured to provide information indicative of the state of the desktop interface in the first remote desktop session to the console session executing in the operating system on the other computing device.

In some embodiments, the operating system is a WINDOWS operating system and the controller computer program is configured to execute as a WINDOWS service. In some embodiments, the processor-executable instructions organized as the controller computer program further cause the at least one hardware processor to download the software robot computer program from another computing device and install the software robot computer program on the operating system. In some embodiments, the processor-executable instructions organized as the controller computer program further cause the at least one hardware processor to assign a password to the first remote desktop session.

According to at least one aspect, a method performed by a computing device is provided. The method comprises starting an operating system installed on the computing device that is configured to execute a plurality of sessions comprising a service session for the computing device, a console session for a local user, and at least one remote desktop session. The method further comprises starting the service session in the operating system responsive to starting the operating system, starting, by a controller computer program being executed in the service session, a first remote desktop session in the operating system, establishing a loopback remote desktop connection between the first remote desktop session and the service session, starting a software robot computer program in the first remote desktop session, and controlling, by the software robot computer program being executed in the first remote desktop session, at least one other computer program executing in the first remote desktop session to perform a task.

In some embodiments, the at least one other computer program comprises a graphical user interface (GUI) and controlling the at least one other computer program to perform the task comprises using the software robot computer program to programmatically control the at least one other computer program at least in part by emulating actions through the GUI of the at least one other computer program.

In some embodiments, the first remote desktop session comprises a desktop interface and the method further comprises providing information indicative of a state of the desktop interface of the first remote desktop session to the service session using the loopback remote desktop connection. In some embodiments, the method further comprises starting a second remote desktop session in the operating system and establishing a shadow connection between the second remote desktop session and the first remote desktop session responsive to receiving a request from another computing device. In some embodiments, the method further comprises providing information indicative of the state of the desktop interface of the first remote desktop session to the second remote desktop session using the shadow connection.

In some embodiments, the operating system is a WINDOWS operating system and the controller computer program is configured to execute as a WINDOWS service. In some embodiments, the method further comprises downloading the software robot computer program from at least one computing device and installing the software robot computer program on the operating system. In some embodiments, the method further comprises assigning a password to the first remote desktop session.

According to at least one aspect, a system is provided. The system comprises at least one hardware processor, at least one non-transitory computer-readable storage medium storing processor-executable instructions organized as a first computer program configured to execute in a first session in an operating system installed on the system, the first computer program, when executed by the at least one hardware processor, causing the at least one hardware processor to perform: establishing a connection between the first session in the operating system and a second session in the operating system, and starting a second computer program in the second session in the operating system.

In some embodiments, the operating system is a WINDOWS operating system, the first session is a service session of the WINDOWS operating system, and the second session is a remote desktop session. In some embodiments, the operating system is a WINDOWS operating system, the first session is a console session of the WINDOWS operating system, and the second session is a remote desktop session. In some embodiments, the first computer program is configured to be executed as a background service in the first session. In some embodiments, the processor-executable instructions organized as the first computer program further cause the at least one hardware processor to start the second session in the operating system.

According to at least one aspect, a system is provided. The system comprises at least one hardware processor and at least one non-transitory computer-readable storage medium storing processor-executable instructions that, when executed by the at least one hardware processor, cause the at least one hardware processor to perform: identifying a software robot computer program from a plurality of software robot computer programs to deploy on a virtual or hardware computing device where at least one of the plurality of software robot computer programs is configured to control at least one other computer program to perform a task, triggering a virtual or hardware computing device comprising an operating system to install a controller computer program that is configured to execute as a background service in a first session in the operating system, providing an indication of the identified software robot computer program to the controller computer program; and triggering the controller computer program to start the identified software robot computer program in a second session in the operating system of the virtual or hardware computing device.

In some embodiments, the virtual or hardware computing device is a virtual machine. In some embodiments, the operating system is a WINDOWS operating system and the controller computer program is configured to execute as a WINDOWS service. In some embodiments, the first session is a service session of the WINDOWS operating system and the second session is a remote desktop session with a remote desktop connection to the service session. In some embodiments, the first computer program is configured to be executed as a background service in the first session. In some embodiments, the processor-executable instructions organized as the first computer program further cause the at least one hardware processor to start the second session in the operating system.

In some embodiments, the second computer program is a software robot computer program configured to control at least one other computer program executing in the second session to perform a task. In some embodiments, the at least one other computer program comprises a graphical user interface (GUI) and the second session is configured generate a desktop interface comprising the GUI. In some embodiments, the software robot computer program is further configured to control the at least one other computer program to perform the task by programmatically controlling the at least one other computer program at least in part by emulating actions through the GUI of the at least one other computer program. In some embodiments, the processor-executable instructions organized as the first computer program further cause the at least one hardware processor to download the software robot computer program from another computing device and install the software robot computer program on the operating system.

In some embodiments, the second session comprises a desktop interface and wherein the second session is configured to provide information indicative of a state of the desktop interface to the first session using the connection. In some embodiments, the processor-executable instructions organized as the first computer program further cause the at least one hardware processor to assign a password to the second session.

According to at least one aspect, a system is provided. The system comprises at least one hardware processor and at least one non-transitory computer-readable storage medium storing processor-executable instructions organized as a first computer program configured to execute in a first session in an operating system installed on the system, the first computer program, when executed by the at least one hardware processor, causing the at least one hardware processor to perform: establishing a connection between the first session in the operating system and a second session in the operating system; and starting a second computer program in the second session in the operating system.

In some embodiments, the operating system is a WINDOWS operating system, the first session is a service session of the WINDOWS operating system, and the second session is a remote desktop session. In some embodiments, the operating system is a WINDOWS operating system, the first session is a console session of the WINDOWS operating system, and the second session is a remote desktop session. In some embodiments, the first computer program is configured to be executed as a background service in the first session. In some embodiments, the processor-executable instructions organized as the first computer program further cause the at least one hardware processor to start the second session in the operating system.

In some embodiments, the second computer program is a software robot computer program configured to control at least one other computer program executing in the second session to perform a task. In some embodiments, the at least one other computer program comprises a graphical user interface (GUI) and the second session is configured generate a desktop interface comprising the GUI. In some embodiments, the software robot computer program is further configured to control the at least one other computer program to perform the task by programmatically controlling the at least one other computer program at least in part by emulating actions through the GUI of the at least one other computer program. In some embodiments, the processor-executable instructions organized as the first computer program further cause the at least one hardware processor to download the software robot computer program from another computing device and install the software robot computer program on the operating system.

In some embodiments, the second session comprises a desktop interface and wherein the second session is configured to provide information indicative of a state of the desktop interface to the first session using the connection. In some embodiments, the processor-executable instructions organized as the first computer program further cause the at least one hardware processor to assign a password to the second session.

According to at least one aspect, a method performed by a computing device is provided. The method comprises starting an operating system installed on the computing device that is configured to execute a plurality of sessions comprising a first session and a second session, starting the first and second sessions in the operating system, establishing, by a first computer program being executed in the first session, a connection between the first session in the operating system and the a second session in the operating system, and starting, by the first computer program being executed in the first session, a second computer program in the second session in the operating system.

In some embodiments, the operating system is a WINDOWS operating system, the first session is a service session of the WINDOWS operating system, and the second session is a remote desktop session. In some embodiments, the operating system is a WINDOWS operating system, the first session is a console session of the WINDOWS operating system, and the second session is a remote desktop session. In some embodiments, the first computer program is configured to be executed as a background service in the first session. In some embodiments, starting the first and second sessions in the operating system comprises starting the second session in the operating system by the first computer program being executed in the first session.

In some embodiments, starting the second computer program in the second session comprises starting a software robot computer program in the first remote desktop session and wherein the method further comprises controlling, by the software robot computer program being executed in the second session, at least one other computer program executing in the second session to perform a task. In some embodiments, the at least one other computer program comprises a graphical user interface (GUI) and controlling the at least one other computer program to perform the task comprises using the software robot computer program to programmatically control the at least one other computer program at least in part by emulating actions through the GUI of the at least one other computer program. In some embodiments, the method further comprises downloading the software robot computer program from at least one computing device and installing the software robot computer program on the operating system.

In some embodiments, the second session comprises a desktop interface and wherein the method further comprises providing information indicative of a state of the desktop interface of the second session to the first session using the connection. In some embodiments, the method further comprises assigning a password to the second session.

Some embodiments provide for at least one non-transitory computer-readable storage medium storing processor-executable instructions to perform any one of the methods described herein such as the methods described above.

It should be appreciated that the aspects, embodiments, and examples described herein (including the embodiments above) may be used individually, all together, or in any combination of two or more.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1:
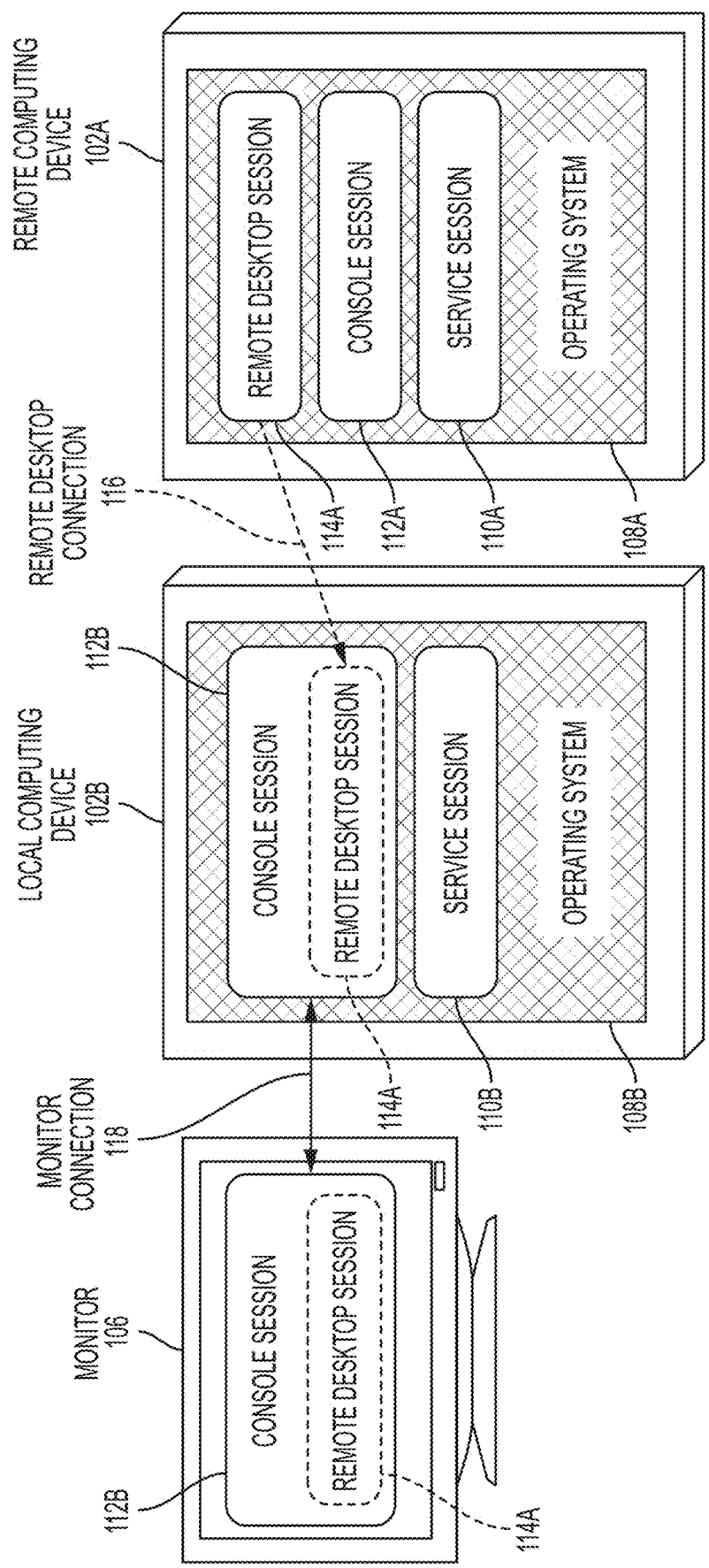
FIG. 1 is a diagram of an example system configuration with a remote desktop connection, according to some embodiments of the technology described herein.

As mentioned above, a software robot may control another computer program to perform a task. The software robot may control the computer program to perform the task by triggering a series of actions to be performed. The software robot may trigger actions to be performed by sending a command to one or more computer programs such as an operating system or any application installed thereon. For example, the software robot may send the command "Sendkeys( )" to a WINDOWS operating system to trigger the WINDOWS operating system to perform a keystroke action. Hereinafter, a software robot triggering another computer program (e.g., an operating system or an application) to perform an action may be referred to as the software robot performing the action for simplicity.

Actions may be categorized as either non-interactive actions or interactive actions. Non-interactive actions may be actions that do not require manipulation of a graphical user interface (GUI) of a computing program. Non-limiting examples of such non-interactive actions include filesystem operations (e.g., opening a file and writing to it) and network operations (e.g., establishing a network connection). Interactive actions may be actions that require use of a GUI of a computer program and/or control of one or more input devices (e.g., a keyboard or a mouse). Non-limiting examples of such interactive actions include clicking on a GUI element of a computer program, providing input to a computer program via its GUI (e.g., by typing in a value into a textbox), and obtaining output from a computer program via its GUI (e.g., by accessing a value displayed in a GUI element of the computer program).

The inventor has appreciated that some actions attempted by a software robot executing in a session of an operating system may be ineffective when the session is in certain states. Thereby, a software robot may suddenly stop working when the state of the session changes. A session may comprise processes and other system objects (e.g., windows and desktop interfaces) associated with a particular user. Some sessions may include the following example states: (1) a logged-in and unlocked state in which a user is logged-in and the screen is unlocked; (2) a logged-in and locked state where a user is logged-in and the screen is locked; and (3) a logged-out and locked state where a user is logged-out and the screen is locked. In the logged-in and unlocked state, the session may permit a software robot to execute normally and perform both interactive and non-interactive actions. If the screen becomes locked (e.g., by pressing a keyboard shortcut such as "WINDOWS key+1" or allowing the system to remain idle for a predetermined period of time), the session may transition from the logged-in and unlocked state to the logged-in and locked state. In the logged-in and locked state, the desktop interface is not accessible without providing authentication credentials (e.g., username and/or password) to unlock the screen. Once the screen becomes locked, normal operation of the software robot is interrupted because interactive actions become ineffective. For example, some WINDOWS library functions, such as "Sendkeys( )" used by software robots to trigger keystrokes, do not work while the session is in the logged-in and locked state. If the user is completely logged-out, the session terminates any applications associated with the user such as the software robot. Thereby, neither interactive nor non-interactive actions may be performed by a software robot in the logged-out and locked state. Table 1 below summarizes the actions that may be performed by a software robot when the session is in each of the logged-in and unlocked state, the logged-in and locked state, and the logged-out and locked state.

TABLE 1

Example Permitted Action Types for Session States

| Session State | | Permitted Actions | |
|---|---|---|---|
| Login State | Screen State | Non-Interactive | Interactive |
| Logged-In | Unlocked (Enabled) | Yes | Yes |
| Logged-In | Locked (Disabled) | Yes | No |
| Logged-Out | Locked (Disabled) | No | No |

Software robots may not always be launched and executed on a computing device by a local user. Sometimes, software robots may be started remotely on a server by a remote user. Typically a software robot is started remotely by logging into a local computing device as a local user and then logging into the server as a remote user from the local computing device. Thereby, a session including a desktop interface may be created for the remote user on the server. The desktop interface associated with the session on the server may then be streamed from the server to the local computing device where the local user may interact with this desktop interface to start a software robot. The inventor has appreciated that executing a software robot remotely on a server in such a fashion creates additional scenarios where operation of the software robot may be interrupted. In particular, the status of the network connection between the server executing the software robot and the local computing device in communication with the server impacts the particular types of actions (e.g., interactive or non-interactive actions) that may be performed by the software robot.

When the server and the local computing device are connected, the session on the server may be in either a logged-in and unlocked state or a logged-in and locked state as described above. If the server and local computing device become disconnected without logging off (e.g., network connection fails), the screen becomes locked and interactive actions attempted by the software robot will fail. The operation of the software robot may be restored by re-establishing the connection between the local computing device and the server in addition to providing authentication credentials (e.g., username and/or password) to unlock the screen. If the server and the local computing device become disconnected by logging off, all of the applications (including the software robot) may be immediately terminated. Table 2 below summarizes the actions that may be performed by a software robot when the session and the network connection are in various states.

TABLE 2

Example Permitted Action Types for Session and Network States

| Session & Network State | | | Permitted Actions | |
|---|---|---|---|---|
| Login State | Screen State | Network State | Non-Interactive | Interactive |
| Logged-In | Unlocked (Enabled) | Connected | Yes | Yes |
| Logged-In | Locked (Disabled) | Connected | Yes | No |
| Logged-In | Locked (Disabled) | Disconnected | Yes | No |
| Logged-Out | Locked (Disabled) | Disconnected | No | No |

The inventor has appreciated that conventional approaches to keeping a software robot executing without interruption in a session involve creating a session and purposely keeping the screen unlocked for extended periods of time while the session is left unattended. As shown above in Table 1, interactive and non-interactive actions may both be performed when the session is in a logged-in and unlocked state. Thereby, leaving the session in the logged-in and unlocked state allows the software robot to perform both interactive and non-interactive actions. The inventor has appreciated that executing a software robot in such a fashion leaves the software robot (and the session on which the software robot is executing) vulnerable to tampering. For example, a passerby of an unlocked and unattended computing device may easily take control of the computing device and interrupt the operation of the software robot or perform other malicious actions. While executing the software robot remotely may make it harder for individuals to obstruct operation of the software robot, a brief network disruption between the server executing the software robot and a local computing device in communication with the server may interfere with the operation of the software robot.

In summary, the inventor identified the particular operating conditions under which a software robot may perform both interactive and non-interactive actions (shown above in Tables 1 and 2) and further identified problems with existing solutions to create an environment that allows the software robot to execute without interruption. In particular, purposefully keeping a screen of an unattended computing device unlocked to allow a software robot to execute leaves the software robot (and the computing device) vulnerable to tampering. Thereby, the inventor recognized that a new technique for executing a software robot was needed that would allow a software robot to perform interactive and non-interactive actions while keeping the software robot protected from unauthorized users.

Accordingly, the inventor has developed techniques to address the above-identified problems. In some embodiments, a computing device may be configured to log into itself as a remote user and establish a connection with another user on the same computing device. Thereby, a single computing device serves as both the server executing the software robot and the local machine in communication with the server. The connection between the two users on the same computing device is virtually unbreakable because the connection does not use any external network elements. In such a configuration, the software robot may execute without interruption in an unlocked desktop interface for the remote user. This unlocked desktop interface for the remote user is protected because the unlocked desktop interface is being projected to another user on the same computing device who may have a locked desktop interface (or even no desktop interface at all). Thereby, a passerby cannot easily access the unlocked desktop interface where the software robot is being executed.

It should be appreciated that not every embodiment addresses every one of the identified problems in the art, and some embodiments may not address any of them. As such, it should be appreciated that aspects of the technology described herein are not limited to addressing all or any of the discussed problems.

Example Implementation

Some aspects of the technology described herein relate to a system configured to create a desktop interface in an operating system for a software robot to use without interruption while the desktop interface is protected from unauthorized users. The system may be configured to create such a desktop interface by establishing a remote desktop connection with itself (hereinafter, a "loopback remote desktop connection"). The system may be any of a variety of hardware or virtual computing devices. For example, the system may be implemented as a hardware computing device or virtual computing device such as a virtual machine (VM). A VM may be an emulation of a hardware computing device that provides the functionality of a hardware computing device to execute one or more computer programs such as an operating system. A VM may include one or more virtualized computer components such as a virtualized processor and virtualized memory. These virtualized components may be assigned a portion (or all) of the computational resources provided by an underlying hardware component. For example, a virtualized processor may be assigned some (or all) of the computational power of a hardware processor.

In some embodiments, the system may be configured to execute an operating system. An operating system may be, for example, a computer program configured to manage the computational resources of the system and provide services to other computer programs. Example operating systems include WINDOWS, LINUX, UNIX, MAC OS, IOS, and ANDROID. The operating system may be configured to execute a plurality of sessions. A session may comprise processes and other system objects (e.g., windows and desktop interfaces) associated with a particular user. Each of the sessions may have a type that is dependent upon the characteristics of the user the created the session. For example, the operating system may create a service session for a system user, a console session for a local user, and a remote desktop session (sometimes called a remote desktop protocol (RDP) session) for a remote user. The system user may be the system itself logging into the operating system to provide various background services to other computer programs running in the operating system. The service session may start automatically when the operating system starts. The local and/or remote user(s) may be human or non-human users. For example, one or more of the local user(s) and the remote user(s) may be a computer program and/or the system itself.

In some embodiments, the system may further include at least one non-transitory computer-readable storage medium such as a hard drive, a flash drive, or an optical disk to store information. The non-transitory computer-readable storage medium may store processor-executable instructions organized as a controller computer program. The controller computer program may be implemented as a service (sometimes called a daemon) that is configured to execute as a background process in the service session of the operating system. The controller computer program may be bootstrapped to the service session to add the controller computer program to the list of computer programs to automatically start when the service session starts. Thereby, the controller computer program may start automatically when the operating system is started.

In some embodiments, the controller computer program, when executed by the at least one hardware processor, may cause the at least one hardware processor to perform various processes. For example, the controller computer program may cause the at least one hardware processor to start a remote desktop session in the operating system and establish a loopback remote desktop connection between the remote desktop session and the service session. The controller computer program may start the remote desktop session by logging in as a remote user from the service session. The controller computer program may assign the remote desktop session a username and/or a password to limit access to the remote desktop session and, thereby, limit the possibility of an outsider later tempering with the remote desktop session.

Once the loopback remote desktop connection is established, information regarding a state of a desktop interface of the remote desktop session may be provided to the service session. The service session, in some embodiments, may entirely ignore the received information and thus not interfere with the desktop interface in the remote desktop session. The controller computer program may start a software robot in the remote desktop session. For example, the controller computer program may download the software robot from an external (or internal) database, install the software robot on the operating system, and start the software robot once it is installed. The software robot may utilize the desktop interface of the remote desktop session to control other computer programs executing in the same remote desktop session. The software robot may, for example, control another application to perform a task by controlling its GUI (e.g., clicking on buttons and/or entering text into fields).

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

Example Operating System Sessions

As discussed above, operating systems may generate a session for each user of the operating system that comprises the processes and other system objects (e.g., windows and desktops) associated with the particular user. In an operating system, there may be multiple types of sessions including, for example, a service session for a system user (e.g., the system itself), a console session for a local user, and a remote desktop session for a remote user. An example system configuration illustrating service, console, and remote desktop sessions is shown in FIG. 1. As shown, a monitor 106 is displaying a desktop interface of a console session 112B executing on an operating system 108B of a local computing device 102B. The monitor 106 is also displaying a desktop interface of a remote desktop session 114A executing on the operating system 108A of another remote computing device 102A. The monitor 106 is connected to the local computing device 102B by a monitor connection 118. The operating system 108B on the local computing device 102B includes a service session 110B and a console session 112B that is connected to a remote desktop session 114A of the remote computing device 102A by a remote desktop connection 116. The operating system 108A of the remote computing device 102A includes service session 110A, console session 112A, and remote desktop session 114A.

The computing devices 102A and 102B may be constructed in any of a variety of ways. In some embodiments, the computing devices 102A and/or 102B may be implemented as hardware computing devices (e.g., a physical computing device) or virtual computing devices (e.g., VMs). For example, the local computing device 102B may be a hardware computing device and the second remote computing device 102A may be a VM executing on a hardware computing device.

The monitor 106 may be any suitable display device. For example, the monitor 106 may be a liquid crystal display (LCD) or a cathode ray tube (CRT). The monitor connection 118 may be a wired connection communicatively coupling the monitor 106 to the local computing device 102B. For example, the monitor connection 118 may comprise a high-definition multimedia interface (HDMI) cable, a video graphics array (VGA) cable, and/or a digital visual interface (DVI) cable.

The remote desktop connection 116 between the computing devices 102A and 102B may carry information regarding a state of a desktop interface associated with the remote desktop session 114A. For example, the remote desktop connection 116 may carry information regarding a state of a plurality of pixels that form the desktop interface. The remote desktop connection 116 may be formed using one or more network elements (e.g., network switches, routers, and/or cables) that communicatively couple the computing devices 102A and 102B. It should be appreciated that the remote desktop connection 116 may allow bi-directional communication between the computing devices 102A and 102B and that the directionality of the arrow in FIG. 1 only illustrates that the desktop interface of the remote desktop session 114A is being provided to the console session 112B (instead of vice versa).

The operating systems 108A and 108B may be computer programs configured to manage the computational resources of the computing device and provide services to other computer programs executing in any of the various sessions (e.g., service, console, or remote desktop sessions). Examples of operating systems are provided herein. It should be appreciated that the operating systems 108A may not be identical to operating system 108B. For example, the operating system 108B may be WINDOWS 10 and the operating system 108A may be WINDOWS SERVER 2016.

The operating systems 108A and 108B may each include a session designated for a system user. Such a session is shown as service sessions 110A and 110B in operating systems 108A and 108B, respectively. The operating systems 108A and 108B may automatically create the service sessions 110A and 110B, respectively, when started. In a WINDOWS operating system, the service session is sometimes referred to as session 0 because the service session is the first session to be created during startup and, thus, receives a session identification (ID) number of "0." The system user may be the most powerful user who has privileges to do anything with the computing device. The service sessions 110A and 110B may omit a desktop interface because the user of the service sessions 110A and 110B is the system itself. The service sessions 110A and 110B may remain logged in so long as the operating systems 108A and 108B, respectively, are still executing.

The operating systems 108A and 108B may further include a session designated for a local user (e.g., a local human user or a local non-human user). Such a session is shown as console sessions 112A and 112B in operating systems 108A and 108B, respectively. The console sessions 112A and 112B may include a desktop interface (unlike the service sessions 110A and 110B) to, for example, facilitate interaction with a human user. The operating systems 108A and 108B may automatically create the console sessions 110A and 110B, respectively, after first creating the service sessions 110A and 110B, respectively. In a WINDOWS operating system, the console session is sometimes referred to as session 1 because the console session is the second session to be created during startup and, thus, receives a session ID number of "1." Thereby, the console sessions 112A and 112B may start without a particular user and await a login by a local user (e.g., wait for a local user to provide an accepted username and/or password). Once a local user logs into the console sessions 112A or 112B, the respective console session may be assigned to the local user. Should the local user logout, the respective console session may immediately terminate all of the applications in the respective console session and await another login by a local user.

The operating system 108A may further include a session designated for a remote user (e.g., a remote human user or a remote non-human user). Such a session is shown as remote desktop session 114A in operating systems 108A. The remote desktop session 114A may include a desktop interface (unlike the service sessions 110A and 110B) to, for example, facilitate interaction with a human user. In a WINDOWS operating system, the remote desktop session typically receives a session ID number of more than "1" (e.g., "2") because the remote desktop session is typically only started after the service session (e.g., session 0) and the console session (e.g., session 1). The desktop interface of the remote desktop session 114A may be streamed via a remote desktop connection 116 to another session on another computing device from which the request for the remote login originated. As shown in FIG. 1, the desktop interface of the remote desktop session 114A may be streamed to the console session 112B of local computing device 102B. In this configuration, the desktop of the remote desktop session 114A is typically presented as a window in the desktop interface of the console session 112B. The remote desktop session 114A may be created by the operating system 108A in response to a request from another computing device (e.g., from the local computing device 102B). Should the remote user logout, the operating system 108A terminates the remote desktop session 114A along with any applications executing in the session.

A summary of the properties of the service sessions 110A and 110B, the console sessions 112A and 112B, and the remote desktop sessions 114A and 114B are provided below in Table 3.

TABLE 3

Properties of Various Session Types

| Session Name | Displayable Desktop Interface | Consequence of User Log Off |
| --- | --- | --- |
| Service Session | No | System User Never Logs Off |
| Console Session | Yes | All Applications in Console Session are Terminated |
| Remote Desktop Session | Yes | Remote Desktop Session is Terminated |

Example Operating System Configurations

Figure 2:
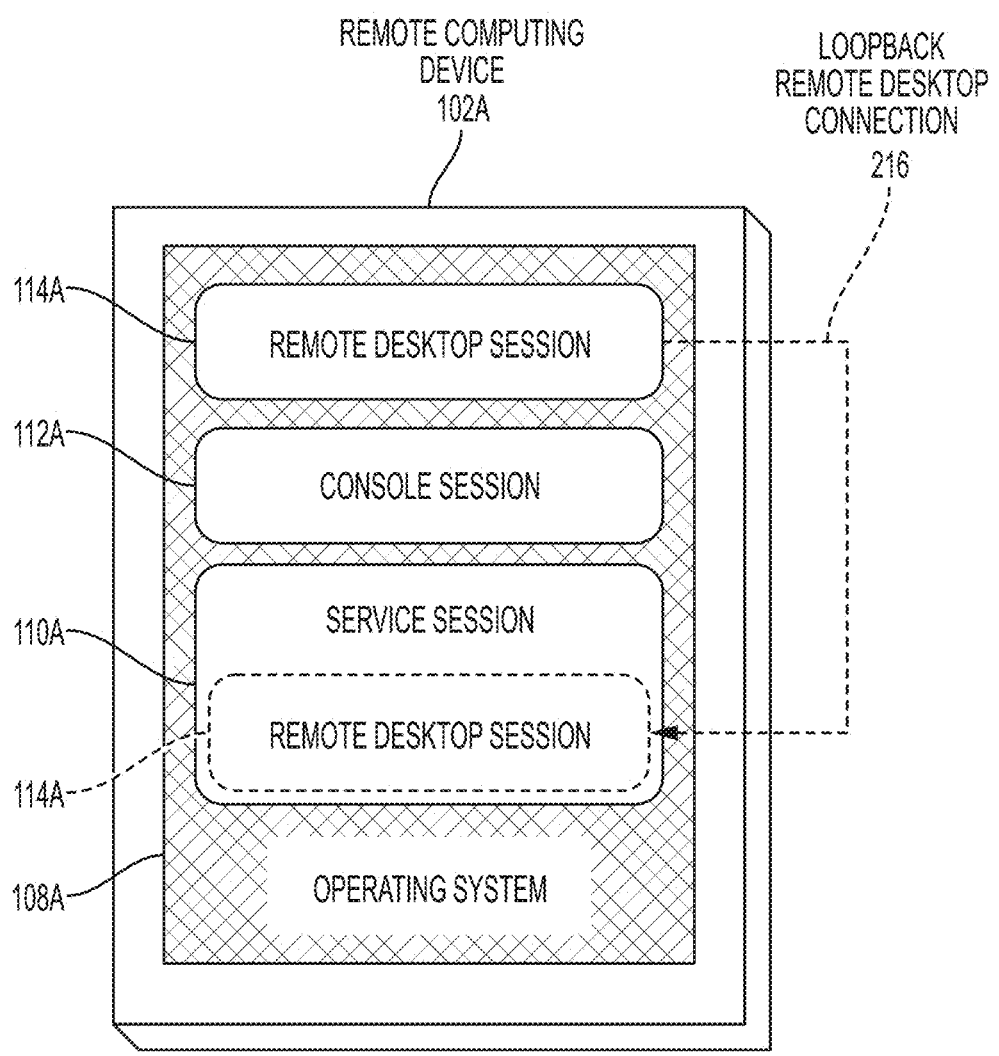
FIG. 2 is a diagram of an example system configuration with a loopback remote desktop connection, according to some embodiments of the technology described herein.

The inventor has developed techniques for implementing persistently interactive software robots. These techniques may involve creating an environment where a software robot may perform interactive and non-interactive actions behind a lock screen irrespective of network interruptions. In some embodiments, a remote desktop session may be created with a connection to a service session in the same operating system to create a loopback remote desktop connection. The loopback remote desktop connection is robust because the connection does not require any external network elements and the service session does not terminated unless the operating system shuts down. Further, neither the remote desktop session executing the software robot nor the service session is directly accessible by an outside user. Thus, the software robot may execute in the remote desktop session on the operating system without being tampered with by other individuals. An example of such a loopback remote desktop connection is shown in FIG. 2. Relative to FIG. 1, the local computing device 102B and the monitor 106 have been removed. Further, the remote desktop session 114A has been connected to the service session 110A in the same operating system 108A by a loopback remote desktop connection 216.

The loopback remote desktop connection 216 connects the remote desktop session 114A to the service session 110A without sending information over a network. Unlike the remote desktop connection 116 shown in FIG. 1 where the desktop interface of the remote desktop session 114A is projected across a network to another computing device, the desktop interface of the remote desktop session 114A is projected to the service session 110A. The service session 110A, however, does not have a desktop interface of its own to incorporate the desktop interface from the remote desktop session 114A into. The service session 110A simply ignores the incoming projection of the desktop interface from the remote desktop session 114A and the remote desktop session 114A is agnostic to the fact that its projected desktop interface is not being displayed by the service session 110A. It should be appreciated that the loopback remote desktop connection 216 may allow bi-directional communication between the remote desktop session 114A and the service session 110A and that the directionality of the arrow in FIG. 2 only illustrates that the desktop interface of the remote desktop session 114A is being provided to the service session 110A (instead of vice versa).

The remote desktop session 114A of the operating system 108A may be a suitable environment to execute a software robot because the remote desktop session 114A includes a desktop interface (unlike the service session 110A) and will not terminate unless the operating system 108A shuts down because the remote desktop session 114A is connected to the service session 110A. Further, the remote desktop session 114A may be password protected to limit the possibility of interference from outside individuals. Although the remote desktop session 114A may become screen locked if the screensaver is activated and potentially disrupt the software robot, the screen saver of the remote desktop session 114A may be disabled. Additionally or alternatively, the software robot may periodically (e.g., every 5 minutes) move the mouse cursor to prevent the screensaver from activating. Thereby, the desktop interface of the remote desktop session 114A may allow a software robot to persistently perform interactive and non-interactive actions behind a lock screen regardless of the status of network connections between the remote computing device 102A and other computing devices.

The remote desktop session 114A and the loopback remote desktop connection 216 may be created in any of a variety of ways. In some embodiments, the loopback remote desktop connection 216 may be created automatically by a controller computer program installed on the operating system 108A. The controller computer program may be implemented as, for example, a service that executes in the service session 110A and is bootstrapped to the service session 110A to execute when the service session 110A starts. The controller computer program may instruct the operating system 108A to start the remote desktop session 114A with a connection to the service session 110A. The controller computer program may disable a screensaver on the remote desktop session 114A to reduce (or eliminate) the possibility of the desktop interface of the remote desktop session 114A becoming locked and interfering with operation of a software robot in the remote desktop session 114A. The controller computer program may provide the operating system 108A with security credentials (e.g., a username and password) to assign the remote desktop session 114A. The security credentials may be stored locally or remotely in an encrypted format such that the controller computer program may access and unencrypt the security credentials to use them for the remote desktop session 114A.

It should be appreciated that the loopback remote desktop connection 216 may be created manually, in some embodiments. For example, an individual may log into the console session 112A and direct the operating system 108A to create a remote desktop session 114A with the loopback remote desktop connection 216 to the service session 110A. The individual may further instruct the operating system 108A to start a software robot in the remote desktop session 114A.

Figure 3:
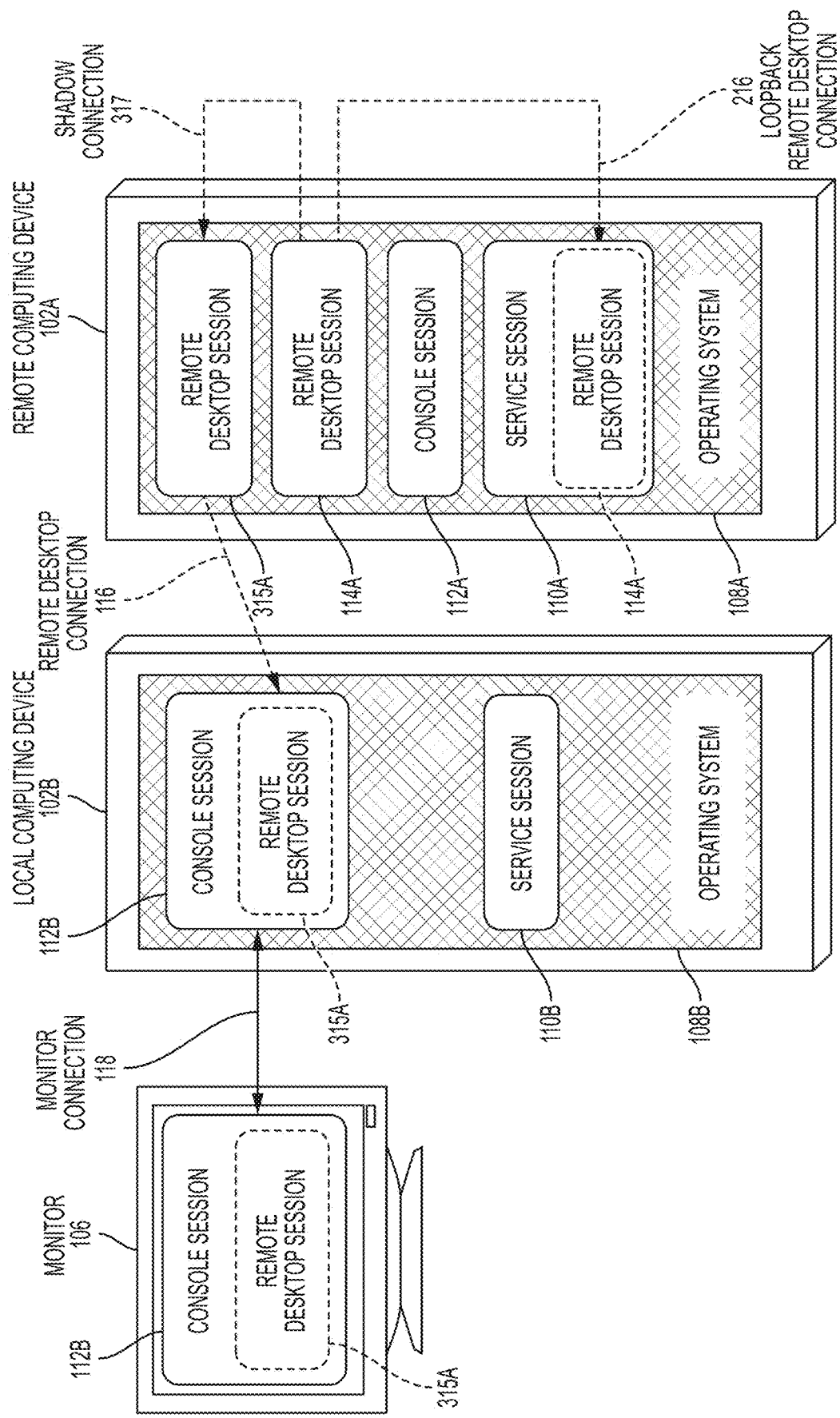
FIG. 3 is a diagram of an example system configuration with a loopback remote desktop connection and a shadow connection, according to some embodiments of the technology described herein.

In some circumstances, an individual (e.g., a software engineer) may want to observe the software robot executing in the remote desktop session 114A, for example, to ensure that the software robot is executing properly. In these circumstances, the software robot in the remote desktop session 114A may be observed by shadowing the remote desktop session 114A. Shadowing the remote desktop session 114A may mirror the desktop interface of the remote desktop session 114A without interrupting the loopback remote desktop connection 216. An example of such a shadow connection is shown in FIG. 3. Relative to FIG. 3, the monitor 106, the local computing device 102B, the remote desktop session 315A, and the shadow connection 317 have been added.

As shown in FIG. 3, an individual may log into the console session 112B of the local computing device 102B that is connected to the monitor 106. From the console session 112B of the local computing device 102B, the remote desktop session 315A may be established in the remote computing device 102A. The desktop interface of the remote desktop session 315A may, in turn, be displayed on the monitor 106 as a window in a desktop interface of the console session 112B. From the remote desktop session 315A, a shadow connection 317 may be created between the remote desktop session 315A and the remote desktop session 114A. The shadow connection 317 may be created by providing one or more commands to the operating system 108A and providing the appropriate credentials (e.g., username and/or password) to shadow the remote desktop session 114A. In a WINDOWS operating system, the shadow connection 317 may be established by running the shadow command (e.g., "mstsc/shadow") with an indication of the particular session to be shadowed (e.g., session 2). Once the shadow connection 317 is established, the desktop interface of the remote desktop session 114A including the software robot may be streamed to the monitor 106 through the remote desktop session 315A. The shadow connection 317 may be subsequently terminated without interfering with the operation of the software robot in the remote desktop session 114A because the loopback remote desktop connection 216 has been left in place.

It should be appreciated that the operating systems 108A and/or 108B may support different combinations of sessions and/or connections than are shown in FIGS. 1-3. For example, the operating system 108A may support additional remote desktop sessions 114A each with a loopback remote desktop connection 216 to the service session 110A. Thereby, a software robot may execute in each instance of the remote desktop session 114A without interfering with each other. Additionally (or alternatively), the loopback remote desktop connection 216 may be to a session other than the service session 110A such as the console session 112A.

Example Software Robot Deployment System

As discussed above, techniques developed by the inventor may be employed to create an environment for a software robot to execute that persistently allows both interactive and non-interactive actions to be performed. For example, a software robot may be executed in a remote desktop session with a loopback remote desktop connection to a service session on the same operating system. The inventor has appreciated that creating such an environment for a software robot may be a time consuming process when larger numbers of software robots are being deployed. For example, a corporation may deploy hundreds of software robots to automate various tasks such as resetting password for users whose passwords have expired.

Figure 4:
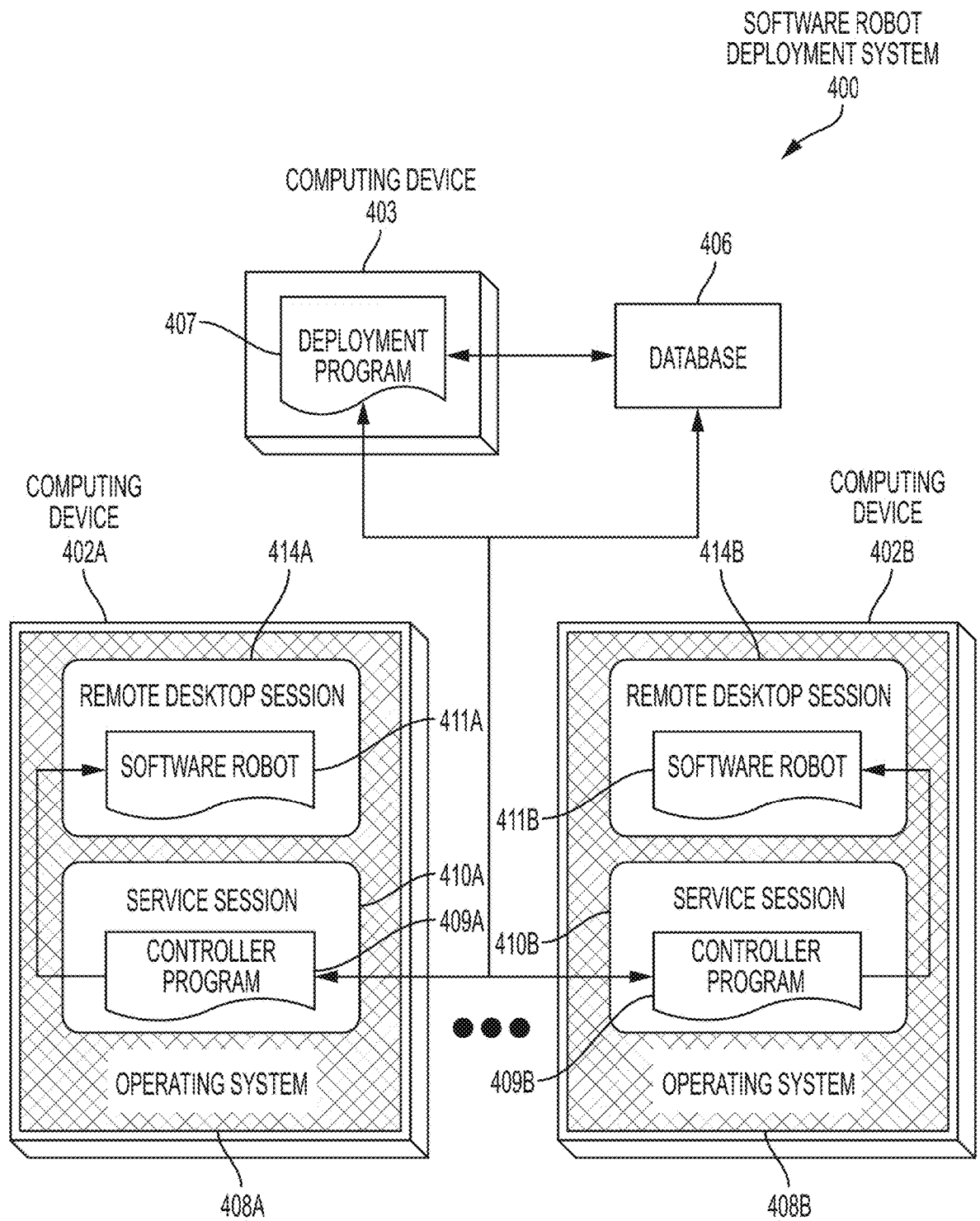
FIG. 4 is a diagram of an example software robot deployment system, according to some embodiments of the technology described herein.

Accordingly, the inventor has developed systems to automatically deploy software robots. In some embodiments, a computing device may be configured to automatically deploy software robots to one or more other computing devices. The computing device may deploy the software robots in response to executing instructions from a deployment computing program. The deployment computing program may be implemented as, for example, an application. The deployment computer program may deploy software robots by deploying controller computer programs to target computing devices and provide an indication of a software robot to execute to each of the deployed controller computer programs. In turn, the controller computer programs may create a remote desktop session with a loopback remote desktop connection and start the indicated software robot in the remote desktop session. An example of such a deployment system is shown in FIG. 4 by deployment system 400.

It should be appreciated that the computing devices 402A and 402B, the operating systems 408A and 408B, the service sessions 410A and 410B, and the remote desktop sessions 414A and 414B in the deployment system 400 may be the same or similar to the remote computing device 102A, the operating system 108A, the service session 110A, and the remote desktop session 114A, respectively, discussed above.

As shown, the deployment system 400 includes a deployment computer program 407 installed on a central computing device 402. The deployment computer program 407 may be configured to deploy controller computer programs 409A and 409B to computing devices 402A and 402B. The controller computer programs 409A and 409B may be implemented as, for example, services that execute in the service sessions 410A and 410B, respectively, of the operating system 408A and 408B, respectively. The controller computer programs 409A and 409B may start the remote desktop session 414A and 414B, respectively, and establish a remote desktop loopback connection between the respective remote desktop session and the respective service session. The controller computer programs 409A and 409B may obtain a software robot computer program 411A and 411B, respectively, from a database 406 and start the respective software robot in the respective remote desktop session.

The computing devices 402A, 402B, and 403 may be constructed in any of a variety of ways. For example, one or more of the computing devices may be virtual or hardware computing devices. For example, the computing devices 402A and 402B may be VMs. The computing devices 402A, 402B, and 403 may be communicatively coupled by various network elements such as network switches, routers, and Ethernet cables.

The database 406 may include a non-transitory computer readable medium, such as a hard drive, a flash drive, or an optical drive, that stores information. The database 406 may be configured to store, for example, copies of the software robots 411A and 411B, copies of one or more computer programs to be controlled by the software robots 411A and 411B, copies of the controller computer programs 409A and 409B, and/or encrypted credentials (e.g., usernames and/or passwords) to assign the remote desktop sessions 414A and 414B. The database 406 need not be separate from the computing devices 402A, 402B, and 403 as shown in FIG. 4. For example, the database 406 may be integrated with the computing device 403.

The deployment computer program 407 may be implemented as an application configured to automatically deploy software robots 411A and 411B to the computing devices 402A and 402B. In some embodiments, the deployment computer program 407 may include a user interface that may be accessed by a user to select a particular software robot to be deployed. For example, the deployment computer program 407 may read information from the database 406 to generate a list of all of the software robots that are available for deployment and present the generated list in the user interface. In this example, the deployment computer program 407 may receive an indication of a particular software robot to deploy and proceed to deploy the indicated software robot.

The deployment computer program 407 may deploy software robots 411A and 411B in any of a variety of ways. In some embodiments, the deployment computer program 407 may first deploy controller computer programs 409A and 409B to computing devices 404A and 404B, respectively. These controller computer programs 409A and 409B may assist in the software robot deployment process. For example, the controller computer programs 409A and 409B may create the remote desktop sessions 414A and 414B, respectively. The controller computer programs 409A and 409B may be implemented as services and be bootstrapped to the service sessions 410A and 410B, respectively. Thereby, the controller computer programs 409A and 409B may automatically start when the service sessions 410A and 410B, respectively, are started. After the controller computer programs 409A and 409B have been installed, the deployment computer program 407 may provide an indication of the particular software robots to be executed to the controller computer programs 409A and 409B. The controller computer programs 409A and 409B may, in turn, retrieve a copy of the software robots 411A and 411B, respectively, from the database 406 and install the software robots. Once the software robot 411A and 411B are installed, the controller computer programs 409A and 409B may start the software robots 411A and 411B in the remote desktop sessions 414A and 414B, respectively.

The software robots 411A and 411B may be configured to control one or more other computer programs to perform a task. For example, the software robots 411A and 411B may be configured to automate a task of generating a purchase order and the software robots 411A and 411B may control a purchase order processing application, such as an enterprise resource planning (ERP) application, to generate the purchase order. The software robots 411A and 411B may be configured to retrieve and install the one or more computer programs which it is configured to control. For example, the software robots 411A and 411B may retrieve a copy of an ERP application that is to be controlled from the database 406. Additional examples of software robots 411A and 411B are described in U.S. patent application Ser. No. 15/059,638, titled "SOFTWARE ROBOTS FOR PROGRAMMATICALLY CONTROLLING COMPUTER PROGRAMS TO PERFORM TASKS," filed on Mar. 3, 2016, which is hereby incorporated herein by reference in its entirety.

Example Processes

Figure 5:
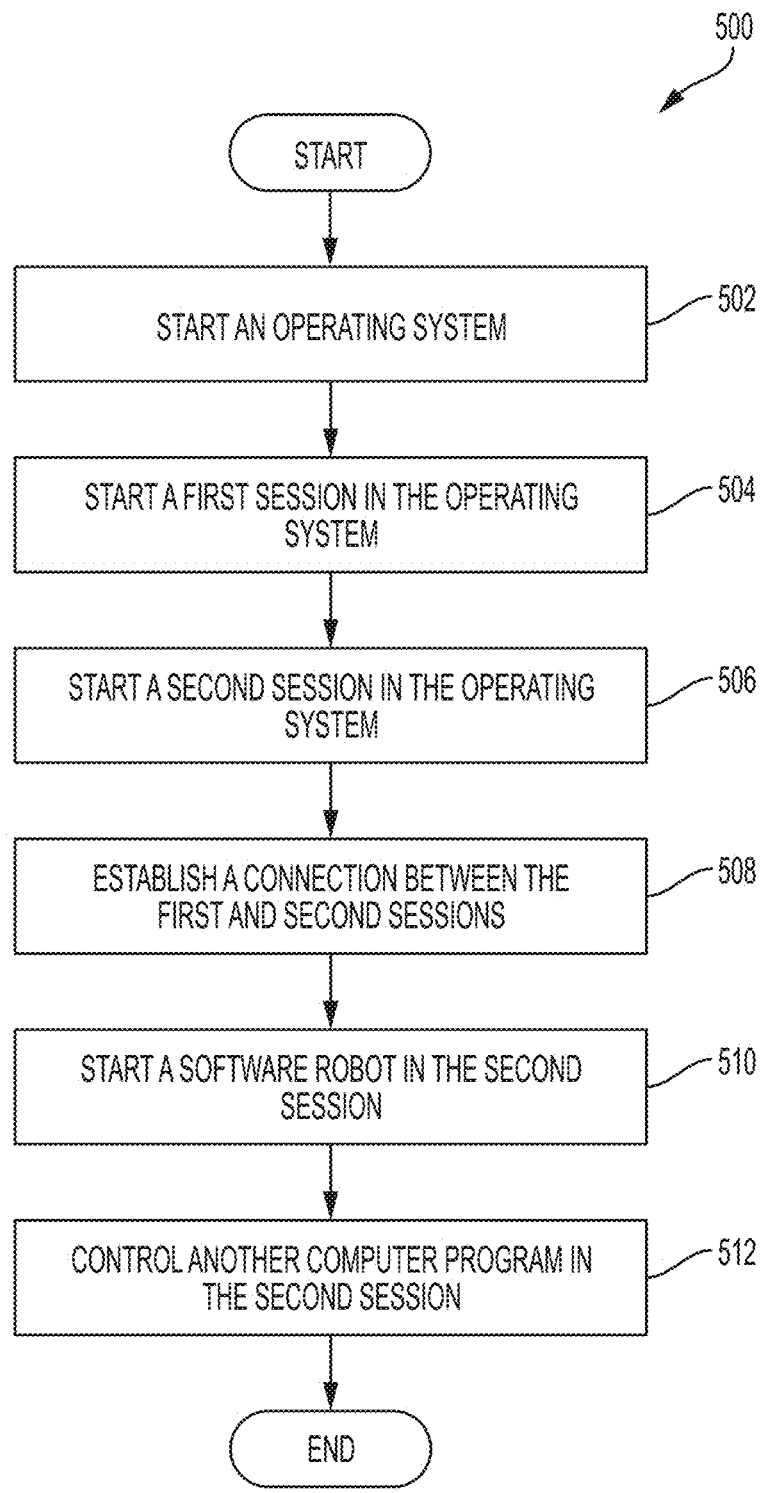
FIG. 5 is a flowchart of an example process for executing a software robot, according to some embodiments of the technology described herein.

As discussed above, the inventor has devised various techniques for creating a desktop interface in an operating system for a software robot computer program to persistently interact with while the desktop interface is locked from outside users. An example process to create such a desktop interface for a software robot is shown in FIG. 5 by process 500 of executing a software robot. Process 500 may be performed by, for example, a computing device such as remote computing device 102A described above. The computing device may perform one or more acts in the process 500 in response to executing instructions of one or more computing programs such as a controller computer program (e.g., controller computer programs 409A and 409B) and/or a software robot (e.g., software robots 411A and 411B) described above. As shown, the process 500 includes an act 502 of starting an operating system, an act 504 of starting a first session in the operating system, an act 506 of starting a second session in the operating system, an act 508 of establishing a connection between the first and second session, an act 510 of starting a software robot in the second session, and an act 512 of controlling another computer program in the second session.

In act 502, the computing device may start an operating system. The computing device may be configured to automatically start the operating system when the computing device is started. For example, the computing device may comprise a VM with an operating system and the operating system of the VM may start whenever the VM is started.

In act 504, the computing device may start a first session (e.g., a service session, a console session, or a remote desktop session) in the operating system. The first session may be started automatically when the operating system starts and remains active until the operating system shuts down. The first session may be, for example, a service session created by logging into the operating system as the system user.

In act 506, the computing device may start a second session (e.g., a service session, a console session, or a remote desktop session) in the operating system. The computing device may assign security credentials to the second session (e.g., a username and/or password) to restrict access to the second session. The second session may be a session that is capable of providing a desktop interface such as a remote desktop session or a console session. The second session may be a different type of session than the first session. For example, the first session may be a service session for a system user and the second session may be a remote desktop session for a remote user.

In act 508, the computing device may establish a connection between the first and second sessions. In some embodiments, the connection between the first and second sessions may be a loopback remote desktop connection. In these embodiments, information indicative of a state of a desktop interface of the second session may be provided to the first session over the loopback remote desktop connection.

In act 510, the computing device may start the software robot in the second session. The computing device may start the software robot in the second session by, for example, obtaining a copy of the software robot from an external or internal database, installing the software robot, and executing the software robot in the second session. Additionally (or alternatively), the computing device may obtain and install a copy of one or more computer programs to be controlled by the software robot. These computer programs may also be executed in the second session.

In act 512, the computing device may control another computer program in the second session. For example, the computing device may interact with one or more GUI elements of the computer program being controlled to perform a particular task in response to executing the software robot. The software robot may be configured to control the other computer program at least in part by: (1) identifying an action to perform in furtherance of the task; (2) automatically accessing one or more objects in an object hierarchy corresponding to one or more active GUI elements of the other computer program; (3) and automatically using the accessed object(s) to cause the other computer program to at least partially (e.g., fully) perform the action.

Figure 6:
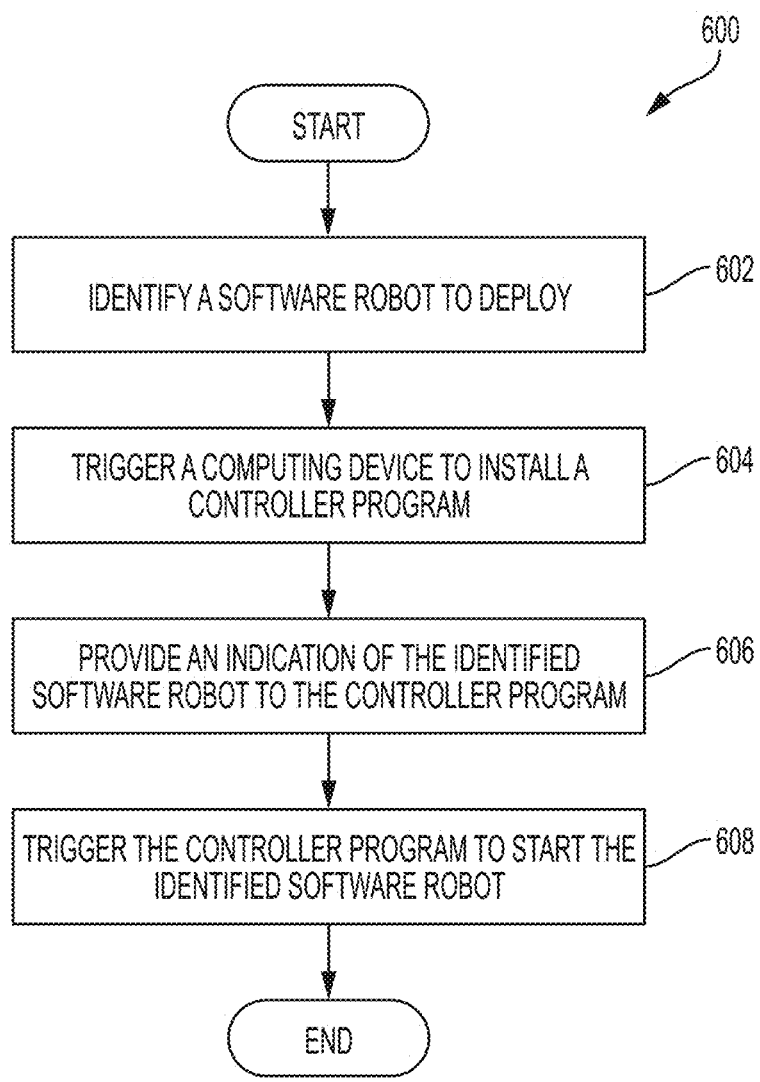
FIG. 6 is a flowchart of an example process for deploying a software robot, according to some embodiments of the technology described herein.

As discussed above, a software robot deployment system (e.g., software robot deployment system 400) may be employed to quickly deploy numerous software robots to multiple computing devices. An example software robot deployment process that may be performed by such a system is shown in FIG. 6 by process 600 for deploying software robots. Process 600 may be performed by, for example, a computing device such as computing device 403 described above. The computing device may perform one or more acts in the process 600 in response to executing instructions of one or more computing programs such as the deployment computer program 407 described above. As shown, the process 600 includes an act 602 of identifying a software robot to deploy, an act 604 of triggering a computing to install a controller computer program, an act 606 of providing an indication of the identified software robot to the controller computer program, and an act 608 of triggering the controller computer program to start the identified software robot.

In act 602, the computing device may identify a software robot to deploy. For example, the computing device may display a user interface including a list of all of the available software robots that may be deployed. The computing device may, in turn, receive an indication of a software robot to deploy from a user.

In act 604, the computing device may trigger a controller computer program to be installed on a target computing device. For example, the computing device may provide a copy of the controller computer program to the target computing device and trigger the computing device to install the controller computer program. The controller computer program may be implemented as, for example, a service that executes in a service session of the target computing device.

In act 606, the computing device may provide an indication of the identified software robot to the controller computer program. For example, the computing device may provide information to the controller computer program on the target computing device that identified the software robot to install (e.g., a name of the identified software robot and/or an address where a copy of the identified software robot may be obtained).

In act 608, the computing device may trigger the controller computer program on the target computing device to start the identified software robot. For example, the computing device may send a command to the controller computer program to cause the controller computer program to start the identified software robot in a remote desktop session of the target computing device. The controller computer program may, upon receipt of the command, cause the targeted computing device to perform, for example, acts 506-512 in process 500 described above to create a remote desktop session with a loopback remote desktop connection to a service session on the same computing device and start the identified software robot in the remote desktop session.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

Example Computer System

Figure 7:
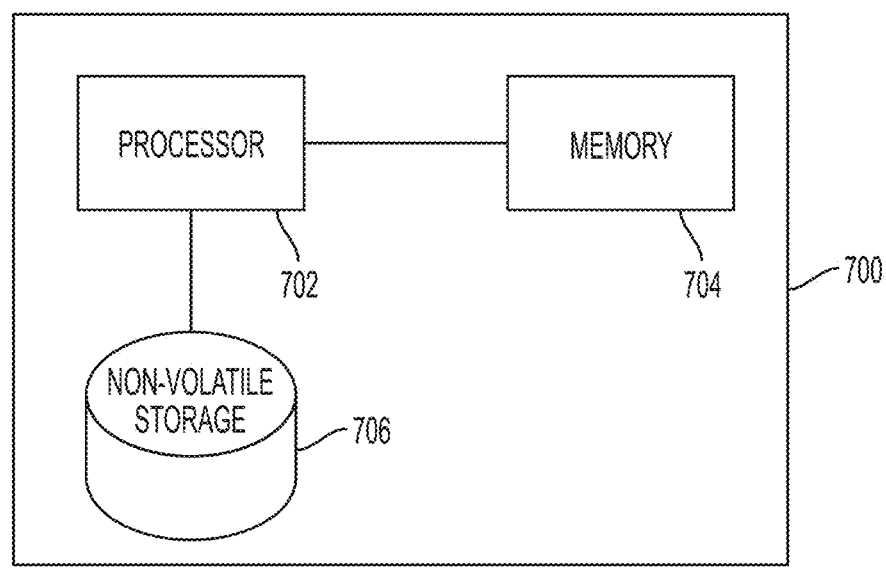
FIG. 7 is a block diagram of an example computer system, according to some embodiments of the technology described herein.

An illustrative implementation of a computer system 700 that may be used in connection with any of the embodiments of the disclosure provided herein is shown in FIG. 7. For example, any of the computing devices described above may be implemented as computing system 700. The computer system 700 may include one or more computer hardware processors 702 and one or more articles of manufacture that comprise non-transitory computer-readable storage media (e.g., memory 704 and one or more non-volatile storage devices 706). The processor 702(s) may control writing data to and reading data from the memory 704 and the non-volatile storage device(s) 706 in any suitable manner. To perform any of the functionality described herein, the processor(s) 702 may execute one or more processor-executable instructions stored in one or more non-transitory computer-readable storage media (e.g., the memory 704), which may serve as non-transitory computer-readable storage media storing processor-executable instructions for execution by the processor(s) 702.

The terms "program" or "software" are used herein in a generic sense to refer to any type of computer code or set of processor-executable instructions that may be employed to program a computer or other processor to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure.

Accordingly, the foregoing description is by way of example only, and is not intended as limiting. The techniques are limited only as defined by the following claims and the equivalents thereto.

What is claimed is:

1. A system, comprising:
   at least one hardware processor configured to execute an operating system, the operating system being configured to execute a plurality of sessions comprising a service session for a system user, a console session for a local user, and at least one remote desktop session; and
   at least one non-transitory computer-readable storage medium storing processor-executable instructions organized as a controller computer program configured to execute in the service session in the operating system that, when executed by the at least one hardware processor, causes the at least one hardware processor to perform:
      starting a first remote desktop session in the operating system;
      generating a desktop interface within the first remote desktop session;
      establishing a loopback remote desktop connection between the first remote desktop session in the operating system and the service session in the operating system;
      providing information indicative of a state of the desktop interface from the first remote desktop session to the service session using the loopback remote desktop connection;
      starting a software robot computer program and an application program different from the software robot computer program in the first remote desktop session, the application program having a graphical user interface; and
      programmatically controlling the application program executing in the first remote desktop session to perform a task,
         wherein the programmatically controlling comprises using the software robot computer program to programmatically emulate user interactions with the graphical user interface of the application program executing in the first remote desktop session in order to cause the application program to perform one or more actions, responsive to the emulated user interactions, in furtherance of the task.

2. The system of claim 1, wherein the operating system is configured to start a second remote desktop session in the operating system and establish a shadow connection between the second remote desktop session and the first remote desktop session responsive to receiving a request from a console session executing in an operating system of another computing device.

3. The system of claim 2, wherein the first remote desktop session is configured to provide information indicative of the state of the desktop interface in the first remote desktop session to the second remote desktop session using the shadow connection.

4. The system of claim 3, wherein the second remote desktop session is configured to provide information indicative of the state of the desktop interface in the first remote desktop session to the console session executing in the operating system on the other computing device.

5. The system of claim 1, wherein the operating system is a WINDOWS operating system and the controller computer program is configured to execute as a WINDOWS service.

6. The system of claim 1, wherein the processor-executable instructions organized as the controller computer program further cause the at least one hardware processor to download the software robot computer program from another computing device and install the software robot computer program on the operating system.

7. The system of claim 1, wherein the processor-executable instructions organized as the controller computer program further cause the at least one hardware processor to assign a password to the first remote desktop session.

8. The system of claim 1, wherein programmatically emulating the user interactions comprises invoking one or more functions of the application program to cause the application program to perform the one or more actions in furtherance of the task.

9. The system of claim 1, wherein programmatically emulating the user interactions comprises invoking one or more functions of the operating system to cause the application program to perform the one or more actions in furtherance of the task.

10. The system of claim 1, wherein the service session is configured to start automatically when the operating system starts and the controller computer program is configured to execute as a background process in the service session.

11. The system of claim 1, wherein the operating system is configured to create the service session when the operating system starts and the service session is configured to remain logged in while the operating system is executing.

12. A method performed by a computing device, the method comprising:
   starting an operating system installed on the computing device that is configured to execute a plurality of sessions comprising a service session for a system user, a console session for a local user, and at least one remote desktop session;
   starting the service session in the operating system responsive to starting the operating system;
   starting, by a controller computer program being executed in the service session, a first remote desktop session in the operating system;
   generating a desktop interface within the first remote desktop session;

establishing a loopback remote desktop connection between the first remote desktop session in the operating system and the service session in the operating system;

providing information indicative of a state of the desktop interface from the first remote desktop session to the service session using the loopback remote desktop connection;

starting a software robot computer program and an application program different from the software robot computer program in the first remote desktop session, the application program having a graphical user interface; and programmatically controlling the application program executing in the first remote desktop session to perform a task, wherein the programmatically controlling comprises using the software robot computer program to programmatically emulate user interactions with the graphical user interface of the application program executing in the first remote desktop session in order to cause the application program to perform one or more actions, responsive to the emulated user interactions, in furtherance of the task.

13. The method of claim 12, further comprising starting a second remote desktop session in the operating system and establishing a shadow connection between the second remote desktop session and the first remote desktop session responsive to receiving a request from another computing device.

14. The method of claim 13, further comprising providing information indicative of the state of the desktop interface of the first remote desktop session to the second remote desktop session using the shadow connection.

15. The method of claim 12, wherein the operating system is a WINDOWS operating system and the controller computer program is configured to execute as a WINDOWS service.

16. The method of claim 12, further comprising downloading the software robot computer program from at least one computing device and installing the software robot computer program on the operating system.

17. The method of claim 12, further comprising assigning a password to the first remote desktop session.

18. A system, comprising:

at least one hardware processor; and at least one non-transitory computer-readable storage medium storing processor-executable instructions organized as a first computer program configured to execute in a service session in an operating system installed on the system, the first computer program, when executed by the at least one hardware processor, causing the at least one hardware processor to perform:

generating a desktop interface within a remote desktop session in the operating system;

establishing a loopback remote desktop connection between the service session in the operating system and the remote desktop session in the operating system, wherein the service session is a session for a system user;

providing information indicative of a state of the desktop interface from the remote desktop session to the service session using the loopback remote desktop connection;

starting a software robot computer program and an application program different from the software robot computer program in the remote desktop session, the application program having a graphical user interface; and programmatically controlling the application program executing in the remote desktop session to perform a task, wherein the programmatically controlling comprises using the software robot computer program to programmatically emulate user interactions with the graphical user interface of the application program executing in the remote desktop session in order to cause the application program to perform one or more actions, responsive to the emulated user interactions, in furtherance of the task.

19. The system of claim 18, wherein the first computer program is configured to be executed as a background service in the service session.

20. The system of claim 18, wherein the processor-executable instructions organized as the first computer program further cause the at least one hardware processor to start the remote desktop session in the operating system.

* * * * *